United States Patent
Lee et al.

(10) Patent No.: US 11,685,308 B2
(45) Date of Patent: Jun. 27, 2023

(54) SWITCH STRUCTURE AND MANUFACTURING METHOD THEREFOR

(71) Applicants: Hyundai Motor Company, Seoul (KR); Kia Motors Corporation, Seoul (KR)

(72) Inventors: Min Ha Lee, Seoul (KR); Ik Jin Jung, Gyeonggi-do (KR); Seung Sik Han, Gyeonggi-do (KR); Young Ju Lee, Gyeonggi-do (KR); Kwan Bo Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 43 days.

(21) Appl. No.: 17/022,720

(22) Filed: Sep. 16, 2020

(65) Prior Publication Data

US 2021/0261049 A1     Aug. 26, 2021

(30) Foreign Application Priority Data

Feb. 26, 2020  (KR) .................. 10-2020-0023420

(51) Int. Cl.
*B60Q 3/20* (2017.01)
*B29C 45/16* (2006.01)
(Continued)

(52) U.S. Cl.
CPC .............. *B60Q 3/20* (2017.02); *B29C 45/12* (2013.01); *B29C 45/1679* (2013.01); *F21V 11/08* (2013.01); *H01H 9/182* (2013.01); *B29C 2045/14737* (2013.01); *B29L 2031/3443* (2013.01); *B60Q 1/0076* (2013.01); *B60Q 1/0082* (2013.01); *B60Q 1/46* (2013.01); *F21V 23/04* (2013.01); *F21W 2106/00* (2018.01); *H01H 9/18* (2013.01); *H01H 13/023* (2013.01);
(Continued)

(58) Field of Classification Search
CPC ...... B60Q 1/0076; B60Q 1/0082; H01H 9/18; H01H 9/182; H01H 2009/184; H01H 13/023; H01H 13/83; H01H 2013/026; H01H 2219/062; H01H 2219/0621; H01H 2219/0622; F21V 23/04
See application file for complete search history.

(56) References Cited

U.S. PATENT DOCUMENTS 5,120,920 A * 6/1992 Moriike ................. H01H 9/182
                                                                        200/341
5,252,798 A * 10/1993 Kamada ............... H01H 13/023
                                                                        200/312
(Continued)

FOREIGN PATENT DOCUMENTS

JP       H06150770 A  *  5/1994  ........... H01H 13/023
KR    2008-0048630 A      6/2008
KR       101876017 B1      7/2018

*Primary Examiner* — Colin J Cattanach
(74) *Attorney, Agent, or Firm* — Fox Rothschild LLP

(57) ABSTRACT

A switch structure includes a light-emitting part configured to receive power from a vehicle and to radiate light, a moving block located so as to surround the light-emitting part, a light-transmissive part configured to allow light radiated from the light-emitting part to pass through an opening in the moving block, and a film-printing layer
(Continued)

located on a top surface of the light-transmissive part and including a symbol.

3 Claims, 3 Drawing Sheets

(51) Int. Cl.
*B29C 45/12* (2006.01)
*F21V 11/08* (2006.01)
*H01H 9/18* (2006.01)
*B60Q 1/46* (2006.01)
*B29L 31/34* (2006.01)
*F21W 106/00* (2018.01)
*B60Q 1/00* (2006.01)
*B29C 45/14* (2006.01)
*H01H 19/02* (2006.01)
*H01H 13/83* (2006.01)
*H01H 13/02* (2006.01)
*F21V 23/04* (2006.01)

(52) U.S. Cl.
CPC ........... *H01H 13/83* (2013.01); *H01H 19/025* (2013.01); *H01H 2009/184* (2013.01); *H01H 2013/026* (2013.01); *H01H 2219/062* (2013.01); *H01H 2219/0621* (2013.01); *H01H 2219/0622* (2013.01)

(56) References Cited

U.S. PATENT DOCUMENTS

| | | | | |
|---|---|---|---|---|
| 5,404,133 | A * | 4/1995 | Moriike | H01H 13/023 362/23.17 |
| 5,993,019 | A * | 11/1999 | Kline | G09F 13/04 362/23.05 |
| 6,180,048 | B1 * | 1/2001 | Katori | H01H 9/182 264/255 |
| 2006/0176710 | A1 * | 8/2006 | Meinke | B60R 13/04 362/503 |
| 2008/0029373 | A1 * | 2/2008 | Hotta | H01H 13/83 200/314 |
| 2009/0257241 | A1 * | 10/2009 | Meinke | B60R 13/005 362/546 |
| 2010/0038224 | A1 * | 2/2010 | Sato | H01H 13/023 200/313 |
| 2011/0298716 | A1 * | 12/2011 | Mahowald | H01H 13/83 345/168 |
| 2015/0060245 | A1 * | 3/2015 | Raupach | H01H 13/023 200/302.2 |
| 2017/0330703 | A1 * | 11/2017 | Lee | B29C 45/14827 |
| 2018/0082801 | A1 * | 3/2018 | Lin | H01H 13/14 |
| 2018/0210486 | A1 * | 7/2018 | Choi | B29C 45/1671 |

* cited by examiner

SWITCH STRUCTURE AND MANUFACTURING METHOD THEREFOR

CROSS-REFERENCE TO RELATED APPLICATION

This application claims under 35 U.S.C. § 119(a) the benefit of Korean Patent Application No. 10-2020-0023420 filed on Feb. 26, 2020, the entire contents of which are incorporated herein by reference.

BACKGROUND

(a) Technical Field

The present disclosure relates to a switch structure and a manufacturing method therefor, more particularly, to the switch structure and manufacturing method capable of providing improved workability and exhibiting improved durability by providing a symbol on a surface of a knob, which is injection-molded using a film-printing method.

(b) Description of the Related Art

In general, a vehicle is provided with an emergency light switch for flashing left and right turn signals simultaneously (i.e., hazard lights) by the driver's operation in order to notify surrounding vehicles of an emergency situation or to warn a following vehicle of an emergency stop.

It is important for a driver to rapidly manipulate an emergency light switch in an emergency situation. To this end, high visibility of the emergency light switch is required, so that a driver is capable of accurately recognizing the position of the emergency light switch and rapidly manipulating the same.

Typically, there is no issue of visibility of the emergency light switch during the daytime. However, when the emergency light switch is illuminated at night, light from a light source passes through both a red portion and a white portion of a symbol of the emergency light switch, thus causing a phenomenon in which the symbol of the emergency light switch appears blurry, and resulting in reduced visibility of the shape of the symbol.

In order to manufacture an emergency light switch, an injection-molding process, three painting processes (red painting, black painting, and high-gloss painting), a laser cutting process, and a symbol printing process are sequentially performed. Here, when light from a light source passes through the red-painted area, the light is required not to pass through the symbol-printed area. However, the light from the light source also passes through the white area in the symbol-printed area, thereby reducing the visibility of the symbol of the emergency light switch.

In many vehicles, not only an emergency light switch but also other switches disposed in the interior of a vehicle are configured to include light sources. Therefore, research has been conducted on a switch structure and a manufacturing method for providing improved visibility at night.

The above information disclosed in this Background section is only for enhancement of understanding of the background of the disclosure, and therefore it may contain information that does not form the related art that is already known in this country to a person of ordinary skill in the art.

SUMMARY

The present disclosure provides a switch structure composed of a single part.

It is another object of the present disclosure to provide a switch structure that is applied to an interior of a vehicle and a manufacturing method therefor, in which a knob is provided on a top surface of a moving block through a film-printing method.

It is a further object of the present disclosure to provide a process capable of simultaneously manufacturing a moving block and a knob using a single mold.

The objects of the present disclosure are not limited to the above-mentioned objects, and other objects not mentioned herein will be clearly understood by those skilled in the art from the following description, and will become apparent with reference to the embodiments of the present disclosure. In addition, the objects of the present disclosure can be accomplished by the components described in the appended claims and combinations thereof.

The switch structure and the manufacturing method therefor for accomplishing the above objects of the present disclosure have the following configurations.

In one aspect, the present disclosure provides a switch structure including a light-emitting part configured to receive power from a vehicle and to radiate light, a moving block located so as to surround the light-emitting part, a light-transmissive part configured to allow light radiated from the light-emitting part to pass through an opening in the moving block, and a film-printing layer located on the top surface of the light-transmissive part and including a symbol.

In a preferred embodiment, the film-printing layer may be formed to have a thickness ranging from 20 to 50 microns.

In another preferred embodiment, each of opposite ends of the film-printing layer may be located inwards from the end of the moving block by 0.1 to 0.3 microns.

In still another preferred embodiment, the film-printing layer may be configured to form a symbol at a position corresponding to the opening in the moving block such that light radiated from the light-emitting part passes therethrough.

In yet another preferred embodiment, the top surface of the moving block, on which the light-transmissive part is located, may be tapered in the height direction of the moving block.

In another aspect, the present disclosure provides a method of manufacturing a switch, the method including the steps of: injection-molding a moving block using an upper mold, injection-molding a knob by engaging the upper mold in which the moving block has been injection-molded with a lower mold, and withdrawing an injection-molded product.

In a preferred embodiment, the injection-molding step may include printing a symbol on a film-printing layer, seating the film-printing layer on the upper end of the lower mold forming the knob, and preforming a film according to the shape of the lower mold forming the knob.

In another preferred embodiment, the preforming step may include inserting the film-printing layer into a portion recessed in the lower mold forming the knob.

In still another preferred embodiment, the injection-molding step may include rotating the upper mold when the moving block is completely injection-molded in one end of the upper mold, and injection-molding the moving block in the opposite end of the upper mold after rotation of the upper mold.

In yet another preferred embodiment, the step of injection-molding the moving block in the opposite end of the upper mold after rotation of the upper mold may be performed simultaneously with the step of injection-molding the knob in one end of the upper mold.

In still yet another preferred embodiment, the method may further include, after a product having the knob that has been injection-molded is withdrawn, rotating the opposite end of the upper mold so as to injection-mold the knob therein.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
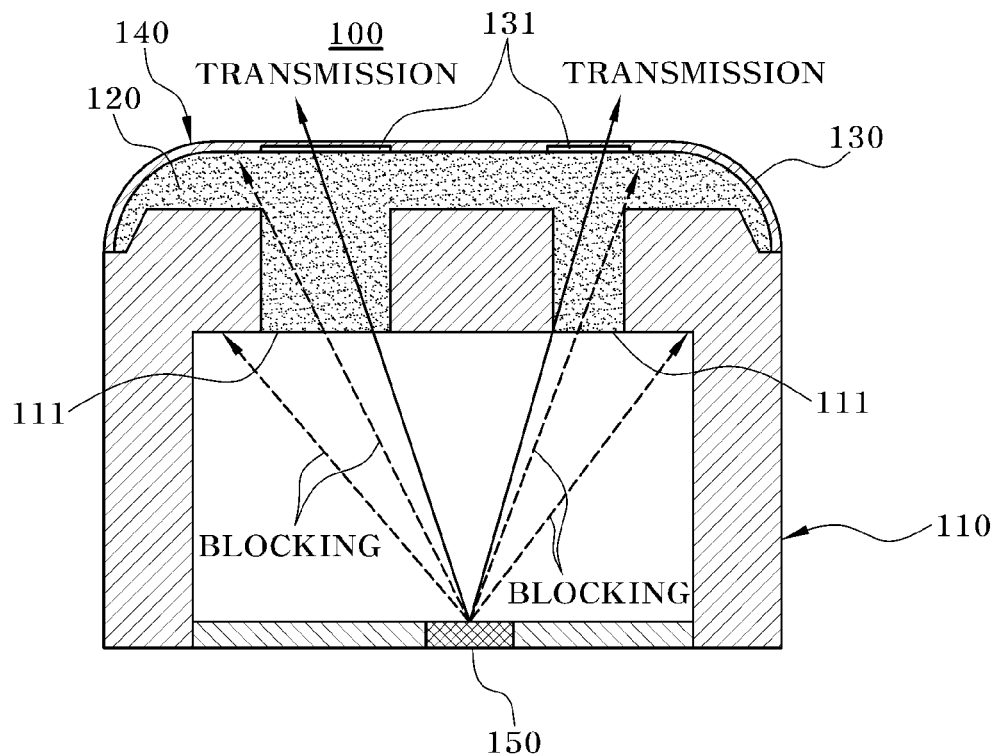
FIG. 1 is a cross-sectional view of an integrally manufactured switch structure according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. The present disclosure may, however, be embodied in many different forms, and should not be construed as being limited to the embodiments set forth herein. Rather, these embodiments are provided so that the disclosure will be more thorough and complete, and will more fully convey the scope of the disclosure to those skilled in the art.

The terms "part", "block", and "layer" used in the specification mean units for processing at least one function or operation, and may be implemented using hardware components, software components, or combinations thereof.

Further, the terms "first" and "second" used in the description of constituent elements mentioned below are intended only to distinguish one element from another element, and are unrelated to the order of the constituent elements.

Furthermore, the term "knob" used in the description may be a constituent element including a "film-printing layer" and a "light-transmissive part".

Conventionally, in order to manufacture a switch, an emergency light switch body, which is white, is first injection-molded. Subsequently, red painting, black painting, and high-gloss painting are sequentially performed, and laser cutting and symbol printing are performed, thereby completing a final product.

However, when the final product is manufactured through these conventional processes, the time taken to produce the product increases due to repetition of painting and drying, thereby increasing manufacturing costs and a defect rate.

Therefore, the present disclosure relates to a switch structure and a manufacturing method therefor, in which a switch is manufactured through two injection-molding processes using a film-printing method.

Figure 2:
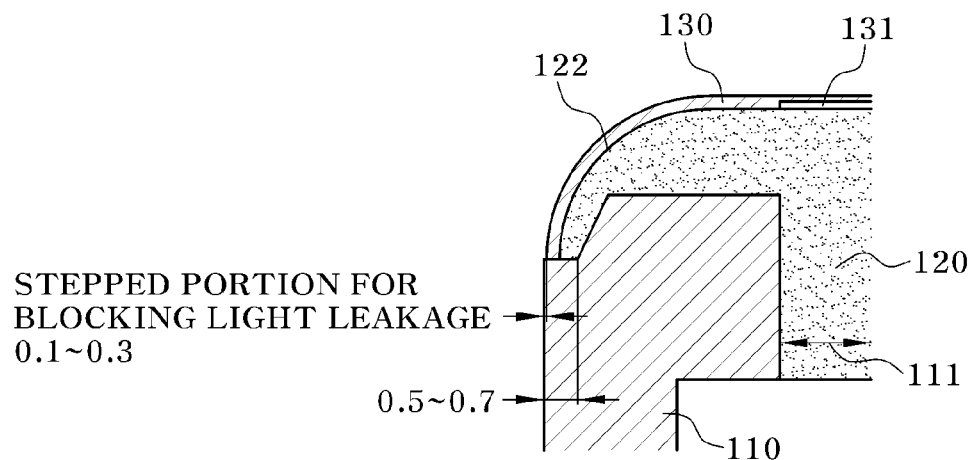
FIG. 2 is an enlarged view of a side surface of the integrally manufactured switch structure according to an embodiment of the present disclosure.

FIGS. 1 and 2 are side sectional views of a structure of a switch 100 according to the present disclosure. The structure of the switch 100 includes a light-emitting part 150 configured to receive power from a vehicle and to radiate light, a moving block 110 disposed so as to surround the light-emitting part 150 and having therein an opening 111 through which the light radiated from the light-emitting part 150 passes, and a light-transmissive part 120 disposed on the top surface of the moving block 110 and configured to allow the light radiated from the light-emitting part 150 to pass therethrough.

The moving block 110 may be configured to be moved in a height direction or in a set direction in response to user input, or may be configured to transmit user input to a controller through a printed circuit board (PCB) located thereunder.

More preferably, the moving block 110 may be configured to prevent the light radiated from the light-emitting part 150 from passing through an area other than a symbol 131, and may be formed to have a dark color.

The moving block 110 may include an opening 111 formed therein to have the same shape as the symbol 131 of a knob 140 located at the top, and may be configured to allow the light radiated from the light-emitting part to pass through the opening 111.

The knob 140 includes a light-transmissive part 120 formed in the opening 111 in the moving block 110 and on the top surface of the moving block 110 so as to have a predetermined height, and includes a film-printing layer 130 disposed on the top surface of the light-transmissive part 120.

The film-printing layer 130 is formed by stacking a film and a printing layer, and a coating material is applied between the film and the printing surface of the symbol 131. Preferably, the film-printing layer 130 is configured such that a release material is printed on a polyethylene terephthalate (PET) film. Further, a coating material is applied in order to prevent peeling or discoloration of the surface of the switch 100, and a primer is applied in order to secure adhesion between the printing surface of the symbol 131, on which a printing ink is printed, and the coating material, thereby completing the film-printing layer 130 on which the symbol 131 is printed.

The light-transmissive part 120 is configured to allow the light radiated from the light-emitting part 150 to pass therethrough. The light-transmissive part 120 may be formed of a transparent material so as to transmit the light passing through the opening 111 in the moving block 110 to the film-printing layer 130.

The film-printing layer 130 may include a symbol 131 having any of various shapes. The symbol 131 may be determined depending on the function and use conditions of the switch 100.

The symbol 131 located in the film-printing layer 130 is configured so as to substantially correspond to the opening 111 located in the moving block 110, and is configured such that the light passing through the light-transmissive part 120 is radiated according to the shape of the symbol 131.

The moving block 110 may be formed such that the width thereof gradually decreases in the height direction. More preferably, the moving block 110 may be formed such that the upper end thereof is tapered in the height direction. Further, the moving block 110 may be formed in a multi-stage shape in which the lower end of the tapered portion and the upper end thereof have surfaces parallel to each other.

The top surface of the moving block 110 may be formed in a multi-stage shape so as to form two parallel surfaces in a side sectional view. The outermost plane of the moving block 110, which forms the bottom surface of the multi-stage portion, may be formed to have a thickness ranging from 0.5 to 0.7 microns.

Therefore, the light-transmissive part 120 may be disposed so as to surround the moving block 110. More preferably, the light-transmissive part 120 may be formed so as to surround the entirety of the upper end of the moving block 110 including the tapered portion.

The knob 140 may be formed at a position further inward toward the center of the moving block 110 than the outermost surfaces of opposite ends of the moving block 110. The side surface of the moving block 110 may be formed to protrude further than the side surface of the knob 140 so as to form a stepped portion 121 therebetween, which has a size ranging from 0.1 to 0.3 microns.

More preferably, the outermost surface among the side surfaces of the knob 140 may be formed so as to be located at a position further inward in the width direction than the outermost surface of the moving block 110, which has a multi-stage structure, by the preset stepped portion 121.

According to an embodiment of the present disclosure, since the side surface of the moving block 110 protrudes further than the side surface of the light-transmissive part 120 that faces the moving block 110, the moving block 110 functions to completely block the leakage of light emitted from the light-emitting part 150.

As described above, the switch structure according to the present disclosure has a structure of preventing the light radiated from the light-emitting part 150 from leaking to an area other than the opening 111 in the moving block 110 due to the outermost shapes of the light-transmissive part 120 and the moving block 110, which have the stepped portion 121 therebetween, and the structure of the top surface of the moving block 110, which has a tapered shape.

The light-transmissive part 120 may be configured such that at least one distal end thereof is formed as a curved portion 122 in a side sectional view. The space between the moving block 110 and the curved portion 122 of the light-transmissive part 120 may be narrower than the space between the moving block 110 and the flat portion of the light-transmissive part 120.

As such, the switch 100 may be configured such that the thickness of the light-transmissive part 120 gradually decreases toward an area closer to the curved portion 122 of the light-transmissive part 120. Owing to the gradual decrease in the thickness of the light-transmissive part 120, it is possible to reduce the amount of light that leaks to the outside from the light-emitting part 150.

In an embodiment of the present disclosure, the film-printing layer 130 may be formed to have a thickness ranging from 20 to 50 microns, and the thickness from the top surface of the moving block 110 to the top surface of the film-printing layer 130 may be 1.3t. In addition, the thickness of the side surface of the moving block 110 may be 1.2t.

Figure 3:
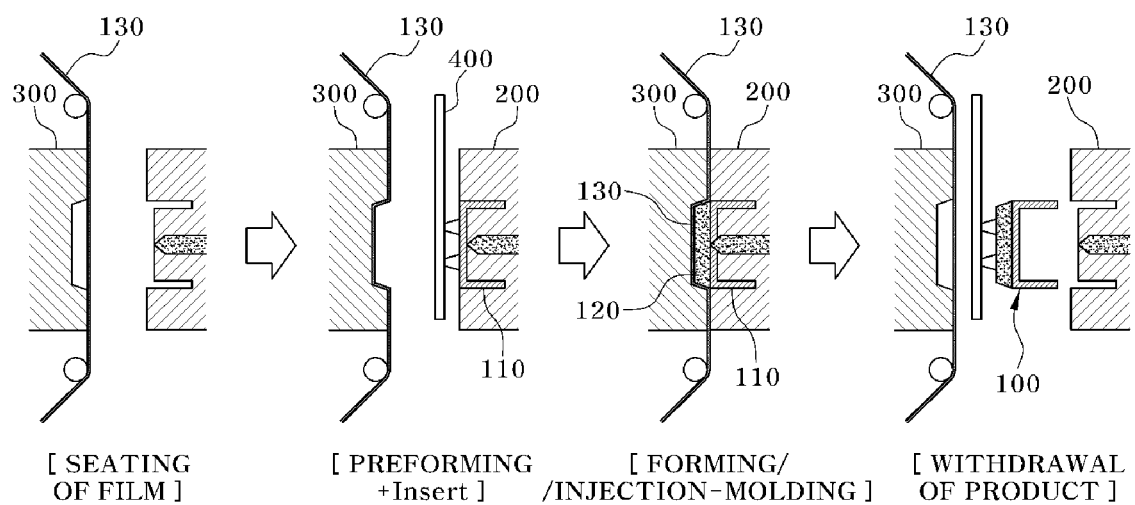
FIG. 3 is a diagram showing manufacturing procedures of a switch using a film-printing method according to an embodiment of the present disclosure.

FIG. 3 shows a method of manufacturing the switch 100 using a film-printing method and an insert injection-molding method according to an embodiment of the present disclosure in a time sequential order.

As shown in FIG. 3, the film-printing layer 130 on which the symbol 131 is printed is fixed to a lower mold 300, and a process of preforming the film-printing layer 130 according to the shape of the lower mold 300 is performed. In addition, the lower mold 300 is configured to injection-mold the light-transmissive part 120, and an upper mold 200 is configured to injection-mold the moving block 110.

The method includes a process of bringing the moving block 110 injection-molded by the upper mold 200 into close contact with the lower mold 300 that has performed preforming and a process of performing injection-molding such that the light-transmissive part 120 is formed according to the shape of the top surface of the moving block 110 and the shape of the lower mold 300.

More preferably, in order to allow the moving block 110 to be injection-molded by the upper mold 200 via an intermediate partition wall 400, molten resin for forming the moving block 110 is introduced into the partition wall 400. After the moving block 110 is injection-molded, the upper mold 200 is brought into contact with the lower mold 300 such that the light-transmissive part 120 is located on the top surface of the moving block 110.

A product, in which the film-printing layer 130 is located on the top surface of the light-transmissive part 120 injection-molded in this manner and the moving block 110 is located on the bottom surface of the light-transmissive part 120, is withdrawn.

More preferably, when the light-transmissive part 120 is injection-molded, a portion of the light-transmissive part 120 is introduced into and fixed in the opening 111 formed in the moving block 110.

In addition, since the intermediate partition wall 400 is included so that the moving block 110 is injection-molded by the upper mold 200, the method includes a process of placing the intermediate partition wall 400 so as to face the upper mold 200 and a process of injecting molten resin for forming the moving block 110 through the intermediate partition wall 400. After the moving block 110 is injection-molded, the upper mold 200 and the lower mold 300 are placed so as to face each other, and molten resin for forming the light-transmissive part 120 is injected along the upper mold 200.

As a result, the switch 100, which includes the moving block 110, the light-transmissive part 120, and the film-printing layer 130, integrally formed with each other through the manufacturing process described above, is provided.

Figure 4:
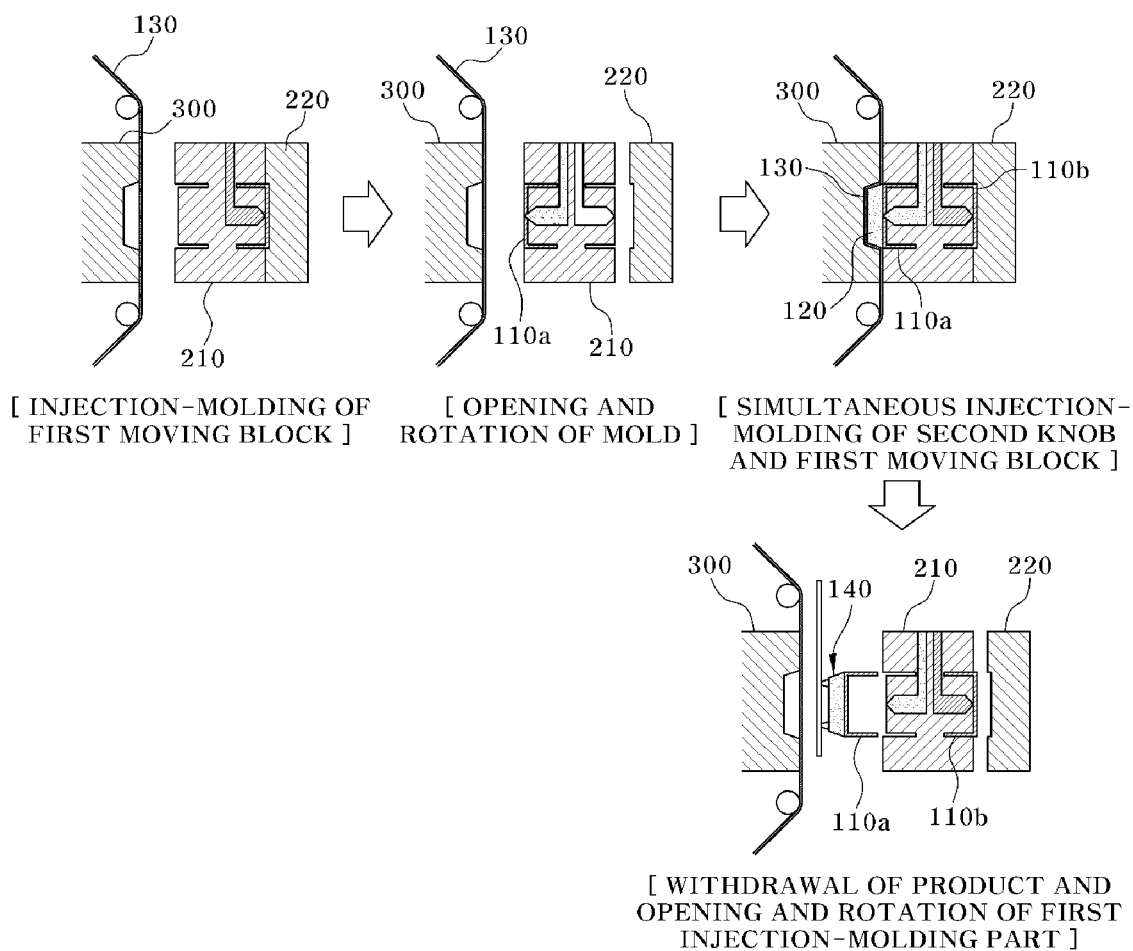
FIG. 4 is a diagram showing the manufacturing procedures of a switch using a film-printing method according to another embodiment of the present disclosure.

FIG. 4 shows a method of manufacturing the switch 100 according to another embodiment of the present disclosure.

In particular, a method of manufacturing the switch 100 using a film-printing method and an insert injection-molding method according to another embodiment of the present disclosure is illustrated in a time sequential order.

A lower mold 300 is placed such that a film covers the lower mold 300 in order to form the film-printing layer 130. The lower mold 300 includes a recess formed therein to injection-mold the light-transmissive part 120.

The upper mold 200 includes one end, which faces the lower mold 300, and an opposite end, which is disposed far from the lower mold 300. The upper mold 200 may include recesses that are formed symmetrically in the one end and the opposite end thereof in order to injection-mold the moving block 110.

More preferably, the upper mold 200 may include a first upper mold 210, which has the recesses formed therein to injection-mold the moving block 110, and a second upper mold 220, which is located adjacent to the opposite end of the upper mold 200.

The first upper mold 210 is configured such that molten resin for forming the moving block 110 is introduced thereinto. A first moving block 110*a* is injection-molded through contact between the first upper mold 210 and the second upper mold 220.

After the first moving block 110*a* is injection-molded, the second upper mold 220 moves away from the first upper mold 210, and the end of the first upper mold 210 in which the first moving block 110*a* has been injection-molded moves to a position close to the lower mold 300.

More preferably, the first upper mold 210 is located between the second upper mold 220 and the lower mold 300, and is configured to be rotatable about one axis of the first upper mold 210. The first moving block 110*a* that has been injection-molded between the first upper mold 210 and the second upper mold 220 is rotated integrally with the first upper mold 210, and is located at the position facing the lower mold 300.

The first upper mold 210 may be rotated about one axis thereof by a driving unit (not shown) such that the injection-molding surface of the first upper mold 210 faces the lower mold 300 or the second upper mold 220.

The injection-molded first moving block 110*a* is located in the end of the first upper mold 210 that has been rotated so as to face the lower mold 300, and the light-transmissive part 120 is injection-molded in the state in which the first upper mold 210 and the lower mold 300 face each other.

As shown in FIG. 4, when the light-transmissive part 120 is injection-molded, the film-printing layer 130 on which the symbol 131 is printed is fixed to the lower mold 300, and is preformed according to the shape of the lower mold 300.

Further, simultaneously with the injection-molding of the light-transmissive part 120 between the first upper mold 210 and the lower mold 300, the opposite end of the first upper mold 210 faces the second upper mold 220 so as to injection-mold a second moving block 110*b*.

When the injection-molding processes between the first upper mold 210 and the second upper mold 220 and between the first upper mold 210 and the lower mold 300 are completed, the switch 100 between the first upper mold 210 and the lower mold 300 is withdrawn, and the first upper mold 210 is rotated such that the end of the first upper mold 210 in which the second moving block 110*b* has been injection-molded faces the lower mold 300.

That is, the light-transmissive part 120 including the film-printing layer 130 is injection-molded between the first upper mold 210 and the lower mold 300, and simultaneously, the moving block 110 is injection-molded between the first upper mold 210 and the second upper mold 220.

As is apparent from the above description, the switch structure and the manufacturing method therefor according to the present disclosure have the following effects.

The present disclosure may provide a switch composed of a single part, thereby reducing manufacturing costs and time.

In addition, the present disclosure may injection-mold a moving block and a knob using a single mold, thereby increasing convenience of manufacturing.

In addition, the present disclosure may remove harmful substances and odor factors by replacing chrome plating technology, thereby improving usability.

The foregoing detailed description of the present disclosure is merely illustrative. The foregoing content is intended to illustrate and describe exemplary embodiments of the present disclosure, and the present disclosure may be used in various other combinations, modifications, and environments. That is, the present disclosure may be modified or changed within the scope of the concept of the present disclosure disclosed herein, the scope equivalent to the foregoing content, and/or the scope of technology or knowledge known in the art. The embodiments described above are intended to describe the best mode for implementing the technical idea of the present disclosure, and various modifications required for specific applications and uses of the present disclosure are also possible. Thus, the foregoing detailed description is not intended to limit the present disclosure to the disclosed modes. The appended claims should be interpreted as also including other modes.

What is claimed is:

1. A switch structure, comprising:
a light-emitting part configured to receive power from a vehicle and to radiate light;
a moving block located so as to surround the light-emitting part; and
a knob formed in an opening of the moving block, wherein the knob includes:
a light-transmissive part configured to allow light radiated from the light-emitting part to pass through the opening in the moving block; and
a film-printing layer located on a top surface of the light-transmissive part, the film-printing layer comprising a symbol;
wherein a top surface of the moving block is tapered in a height direction of the moving block and wherein the light-transmissive part is configured to surround the upper end of the moving block having a tapered shape;
wherein the side surface of the moving block adjacent to the top surface of the moving block is formed to protrude further than a respective side surface of the knob so as to form a stepped portion between the side surface of the moving block and the side surface of the knob;
wherein each of opposite ends on the film-printing layer is located inwards from an end of the moving block by 0.1 to 0.3 microns.

2. The switch structure of claim 1, wherein the film-printing layer is formed to have a thickness ranging from 20 to 50 microns.

3. The switch structure of claim 1, wherein the film-printing layer is configured to form a symbol at a position corresponding to the opening in the moving block such that light radiated from the light-emitting part passes therethrough.

* * * * *